United States Patent
Roberts et al.

(10) Patent No.: US 9,654,819 B2
(45) Date of Patent: May 16, 2017

(54) METHODS AND SYSTEMS FOR PROVIDING SOURCE-AGNOSTIC ACCESS TO MEDIA PROGRAMS

(71) Applicant: Verizon Patent and Licensing Inc., Arlington, VA (US)

(72) Inventors: Brian F. Roberts, Dallas, TX (US); George M. Higa, Plano, TX (US); Anthony Lemus, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 63 days.

(21) Appl. No.: 14/675,530

(22) Filed: Mar. 31, 2015

(65) Prior Publication Data
US 2016/0127789 A1 May 5, 2016

Related U.S. Application Data

(60) Provisional application No. 62/072,863, filed on Oct. 30, 2014.

(51) Int. Cl.
*H04N 21/472* (2011.01)
*H04N 21/431* (2011.01)
(Continued)

(52) U.S. Cl.
CPC ....... *H04N 21/4312* (2013.01); *G06F 3/0482* (2013.01); *H04N 21/252* (2013.01); *H04N 21/25891* (2013.01); *H04N 21/4316* (2013.01); *H04N 21/44218* (2013.01); *H04N 21/44222* (2013.01); *H04N 21/4532* (2013.01); *H04N 21/4586* (2013.01); *H04N 21/4622* (2013.01); *H04N 21/4661* (2013.01); *H04N 21/4667* (2013.01); *H04N 21/472* (2013.01);
(Continued)

(58) Field of Classification Search
USPC ......................................... 725/40
See application file for complete search history.

(56) References Cited

U.S. PATENT DOCUMENTS

2007/0157249 A1* 7/2007 Cordray ............... G06F 3/0482
725/58
2010/0251304 A1* 9/2010 Donoghue ......... H04N 5/44543
725/46
(Continued)

*Primary Examiner* — Pankaj Kumar
*Assistant Examiner* — Charles N Hicks

(57) ABSTRACT

An exemplary computer-implemented media service system detects user input representative of a request by a user to flag a set of related media programs, monitors an availability of the media programs from a plurality of different presentation sources, determines when the user is likely to access each media program included in the set of related media programs, dynamically selects, based on the monitored availability of the media programs from the different presentation sources and on when the user is likely to access each media program included in the set of related media programs, a presentation source from the plurality of different presentation sources for each media program included in the set of related media programs, and provides the user with access to each media program included in the set of related media programs by way of a single user interface. Corresponding systems and methods are also described.

20 Claims, 8 Drawing Sheets

(51) Int. Cl.
  *H04N 21/45*     (2011.01)
  *H04N 21/466*    (2011.01)
  *H04N 21/442*    (2011.01)
  *H04N 21/462*    (2011.01)
  *H04N 21/4725*   (2011.01)
  *H04N 21/475*    (2011.01)
  *H04N 21/482*    (2011.01)
  *H04N 21/81*     (2011.01)
  *G06F 3/0482*    (2013.01)
  *H04N 21/4788*   (2011.01)
  *H04N 21/458*    (2011.01)
  *H04N 21/25*     (2011.01)
  *H04N 21/258*    (2011.01)
  *H04N 21/658*    (2011.01)

(52) U.S. Cl.
  CPC ..... *H04N 21/4725* (2013.01); *H04N 21/4755* (2013.01); *H04N 21/4788* (2013.01); *H04N 21/47202* (2013.01); *H04N 21/47205* (2013.01); *H04N 21/4821* (2013.01); *H04N 21/4825* (2013.01); *H04N 21/4826* (2013.01); *H04N 21/6582* (2013.01); *H04N 21/8133* (2013.01)

(56) References Cited

U.S. PATENT DOCUMENTS

| | | | |
|---|---|---|---|
| 2011/0179446 A1* | 7/2011 | Karaoguz | H04N 21/44016 725/32 |
| 2013/0035086 A1* | 2/2013 | Chardon | H04N 21/00 455/420 |

* cited by examiner

US 9,654,819 B2

METHODS AND SYSTEMS FOR PROVIDING SOURCE-AGNOSTIC ACCESS TO MEDIA PROGRAMS

RELATED APPLICATIONS

The present application claims priority under 35 U.S.C. §119(e) to U.S. Provisional Patent Application No. 62/072,863, filed Oct. 30, 2014. The contents of the provisional patent application are hereby incorporated by reference in their entirety.

BACKGROUND INFORMATION

With the plethora of media programs available by way of subscription television services and other types of media services, a user of such media services may often encounter a media program that he or she has never before seen and that interests the user. For example, while channel surfing, a user may encounter a particular episode in a television series that interests the user. In this situation, the user may direct a media content processing device (e.g., a set-top box device) to search for and record upcoming episodes of the television series. However, if the user wishes to view previously aired episodes of the television series, the user may have to manually search for the episodes within other presentation sources (e.g., video-on-demand libraries). This may be inconvenient for the user and may result in missed viewing opportunities for the user if the user cannot manually find all of the previously aired episodes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
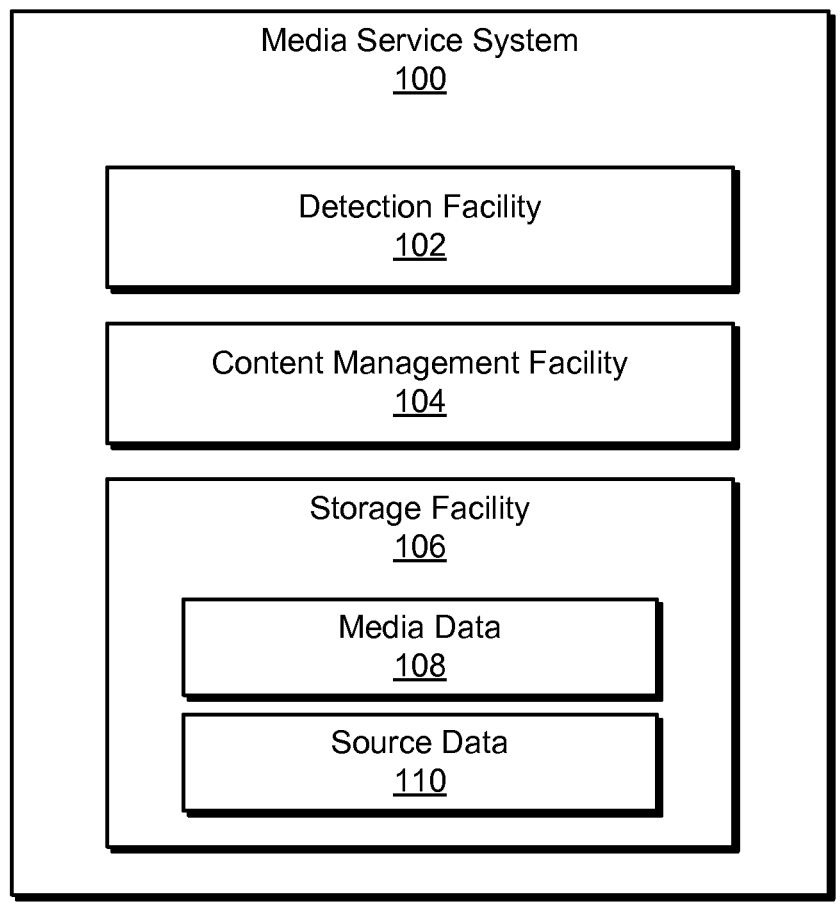
FIG. 1 illustrates an exemplary media service system according to principles described herein.

Methods and systems for providing source-agonistic access to media programs are described herein. For example, as will be described in more detail below, an exemplary computer-implemented media service system may detect user input representative of a request by a user to flag a set of related media programs as being of interest to the user. In response, the media service system may monitor an availability of the media programs from a plurality of different presentation sources, determine when the user is likely to access each media program included in the set of related media programs, and dynamically select, based on the monitored availability of the media programs from the different presentation sources and on when the user is likely to access each media program included in the set of related media programs, a presentation source from the plurality of different presentation sources for each media program included in the set of related media programs. The media service system may then provide the user with access to each media program included in the set of related media programs by way of a single user interface regardless of which presentation source included in the plurality of different presentation sources is selected for each media program included in the set of related media programs.

To illustrate, a user may navigate to an entry included in an interactive program guide and that is representative of a media program scheduled for future broadcast. The user may flag the media program as being of interest to the user (e.g., by selecting an option to add the media program to a "watchlist" associated with the user). In response, the media service system described herein may determine that the media program is an episode included in a program series that includes a plurality of episodes—some that have already aired and some that have yet to be aired. In order to provide the user with access to all of the episodes in the program series, the media service system may monitor, over the course of time subsequent to the user flagging the media program, an availability of the episodes from a plurality of different presentation sources (e.g., by searching for upcoming airings of the episodes by a broadcast television source and searching for previously aired episodes in one or more video-on-demand sources). The media service system may also determine when the user is likely to view each of the episodes.

Based on the monitored availability and on when the user is likely to view each of the episodes, the media service system may dynamically select how each media program is to be made available for access to the user. For example, the media service system may select a video-on-demand source as the presentation source that is used to provide the user with access to a first subset of episodes in the program series and a broadcast television source as the presentation source that is used to provide the user with access to a second subset of episodes in the program series.

As will be described below, the system may dynamically change the presentation source that is used for a particular episode over time (e.g., in response to a change in the monitored availability of the particular episode from the plurality of different presentation sources and/or a change in when the user is likely to access the particular media program). However, regardless of which presentation source is selected for each episode, the media service system may provide the user with source-agnostic access to each episode by way of a single user interface. As used herein, "source-agnostic access" refers to the user being able to obtain access to a set of related media programs by way of the same user interface without having to be aware of which presentation source is being used provide access to each media program included in the set.

The methods and systems described herein may seamlessly bridge presentation sources in a manner that allows a user to simply flag a particular media program in order to gain consolidated access to a plurality of related media programs, even if each media program is not available from the same presentation source. By also basing the presentation source selection on when the user is likely to access each media program, the methods and systems described herein may efficiently manage digital video recorder ("DVR") storage space, effectively allocate bandwidth, and ensure that the media programs are available when the user wants to access them.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content (e.g., subscription television content and/or media-on-demand content). For example, system 100 may provide one or more features of a subscription television service through which end users of the service have access to various media programs. System 100 may be associated with (e.g., operated by) a provider of the media service ("service provider") and/or any other entity as may serve a particular implementation.

As shown, system 100 may include, without limitation, a detection facility 102, a content management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store data generated and/or used by detection facility 102 and/or content management facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video program, movie, audio program, radio program, or any other media program that a user may access by way of the media service. Such media programs that are made available for user consumption through a media service may be accessed and/or played back by an appropriately configured media player device for presentation to a user.

Media data 108 may represent actual content of media content and/or information about the media content. For example, media data 108 may include metadata (e.g., information about genre, cast, title, playback duration, release date, chaptering information, etc.) and/or enriched metadata (e.g., user-defined tags, ratings, etc.) for the media content.

Storage facility 106 may additionally or alternatively store source data 110 representative of or otherwise associated with various presentation sources that may be used to provide a user with access to media programs. As used herein, a "presentation source" refers to a source that may be used by a media content processing device to acquire (e.g., record) and/or otherwise make a media program available for access by a user. Exemplary presentation sources will be described in more detail below.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by detection facility 102 and/or content management facility 104. In certain examples, data generated by detection facility 102 and/or content management facility 104 may be stored permanently or temporarily to storage facility 106.

Detection facility 102 may detect user input representative of a request by a user to flag a set of related media programs as being of interest to the user. The user input may be provided by the user in any suitable manner. For example, the user input may be transmitted by a remote control device associated with a media content processing device (e.g., in response to the user selecting a dedicated button on the remote control device). The user input may be provided in any other suitable manner. Exemplary manners in which detection facility 102 may detect user input representative of a request to flag a set of related media programs as being of interest to the user will be described below.

Content management facility 104 may perform various content management operations. For example, in response to detection facility 102 detecting user input representative of a request by a user to flag a media program as being of interest to the user, content management facility 104 may monitor an availability of the media programs from a plurality of different presentation sources and determine when the user is likely to access each media program included in the set of related media programs. Based on the monitored availability of the media programs from the different presentation sources and on when the user is likely to access each media program included in the set of related media programs, content management facility 104 may dynamically select a presentation source from the plurality of different presentation sources for each media program included in the set of related media programs and provide the user with access to each media program included in the set of related media programs by way of a single user interface regardless of which presentation source included in the plurality of different presentation sources is selected for each media program included in the set of related media programs. Each of these operations will be described in more detail below.

Figure 2:
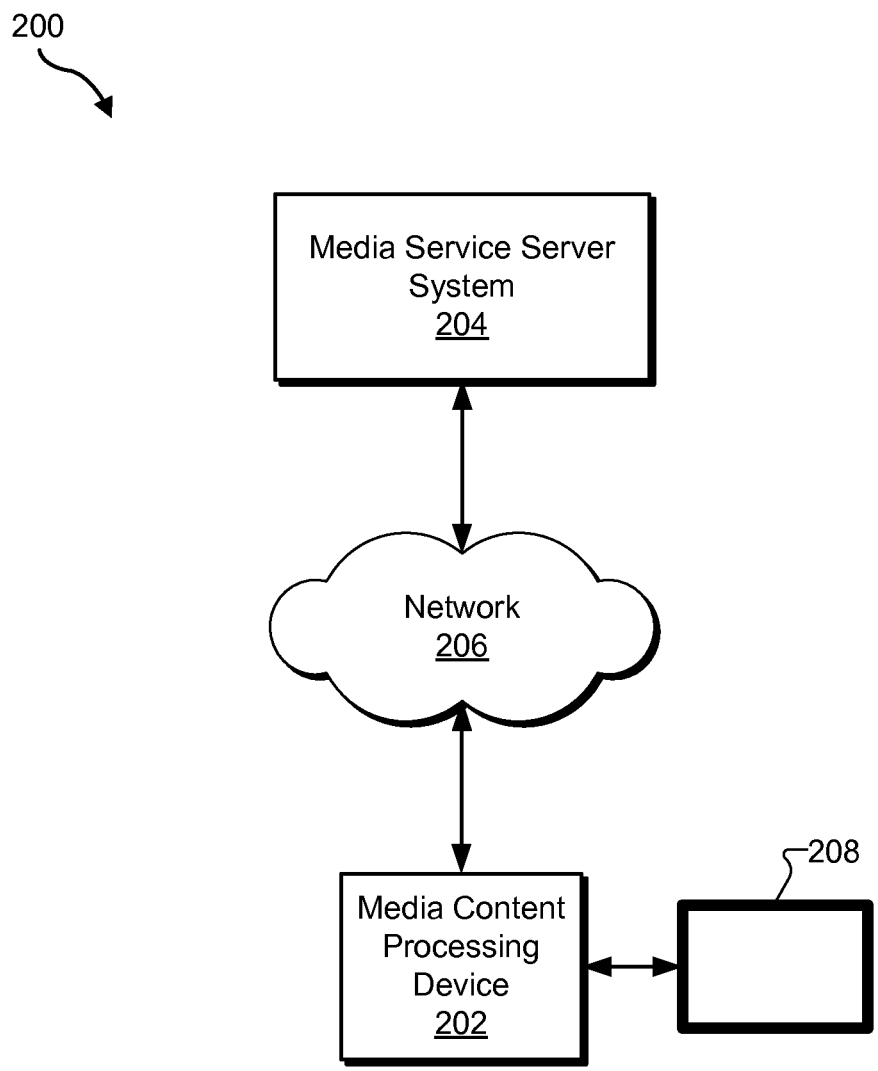
FIG. 2 shows an exemplary implementation of the system of FIG. 1 according to principles described herein.

FIG. 2 shows an exemplary implementation 200 of system 100. As shown, implementation 200 may include a media content processing device 202 in communication with a media service server system 204 ("server system 204"), which may include one or more computing devices (e.g., server devices remotely located from media content processing device 202) by way of a network 206. Implementation 200 may also include a display screen 208 in communication with media content processing device 202.

In implementation 200, one or more of facilities 102-106 of system 100 may be implemented entirely by media content processing device 202, entirely by server system 204, or distributed across media content processing device 202, server system 204, and/or display screen 208 in any manner. System 100 may alternatively be at least partially implemented by one or more computing devices or systems separate from media content processing device 202 and server system 204. For example, system 100 may be at least partially implemented by a computing system maintained by a third-party entity other than a media service provider associated with server system 204.

Media content processing device 202 and server system 204 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, media content processing device 202 and server system 204 may communicate via network 206. Network 206 may include one or more networks, such as one or more wireless networks (Wi-Fi networks), wireless communication networks, mobile telephone networks (e.g., cellular telephone networks), closed media networks, open media networks, wide area networks (e.g., the Internet), subscriber television networks, local area networks, and any other networks capable of carrying data (e.g., streaming and/or downloading media programs) and/or communications signals between media content processing device 202 and server system 204. Communications between media content processing device 202 and server system 204 may be transported using any one of the above-listed networks, or any combination or sub-combination of the above-listed networks. Alternatively, media content processing device 202 and server system 204 may communicate in another way such as by direct connections between media content processing device 202 and server system 204.

Server system 204 may be configured to distribute media programs to media content processing device 202 for access and use by media content processing device 202 to present media programs for consumption by users. Server system 204 may distribute media programs to media content processing device 202 as part of the media service provided by system 100 and using any suitable media streaming and/or downloading technologies (e.g., Internet media streaming and/or downloading technologies). The media service may include a subscription television service, an online media streaming service such as an Internet streaming video service, and/or any other type of media service as may serve a particular implementation.

Media content processing device 202 may include one or more user computing devices associated with a user. Examples of such devices include, without limitation, a media player computing device, a display device, a set-top box device, a digital video recording ("DVR") device, a computer, a tablet computer, a smart phone device, and any other device capable of accessing the media service and/or media programs provided by system 100.

Media content processing device 202 may be configured for use by a user associated with (e.g., operating) the media content processing device 202 to access a media service. For example, the user may utilize the media content processing device 202 to access one or more user interfaces provided by server system 204 and/or media content processing device 202 as part of the media service, and to present the user interfaces for use by the user to discover, access, and/or consume media programs and/or discrete installments of media programs distributed by server system 204 as part of the media service.

In some examples, media content processing device 202 may present media programs and one or more interfaces associated with a media service by way of display screen 208. Display screen 208 may include a television, display monitor, and/or any other device separate from media content processing device 202, as shown in FIG. 2. Alternatively, display screen 208 may be integrated into media content processing device 202. For example, display screen 208 may include a display screen integrated into a tablet computer or smart phone device.

Figure 3:
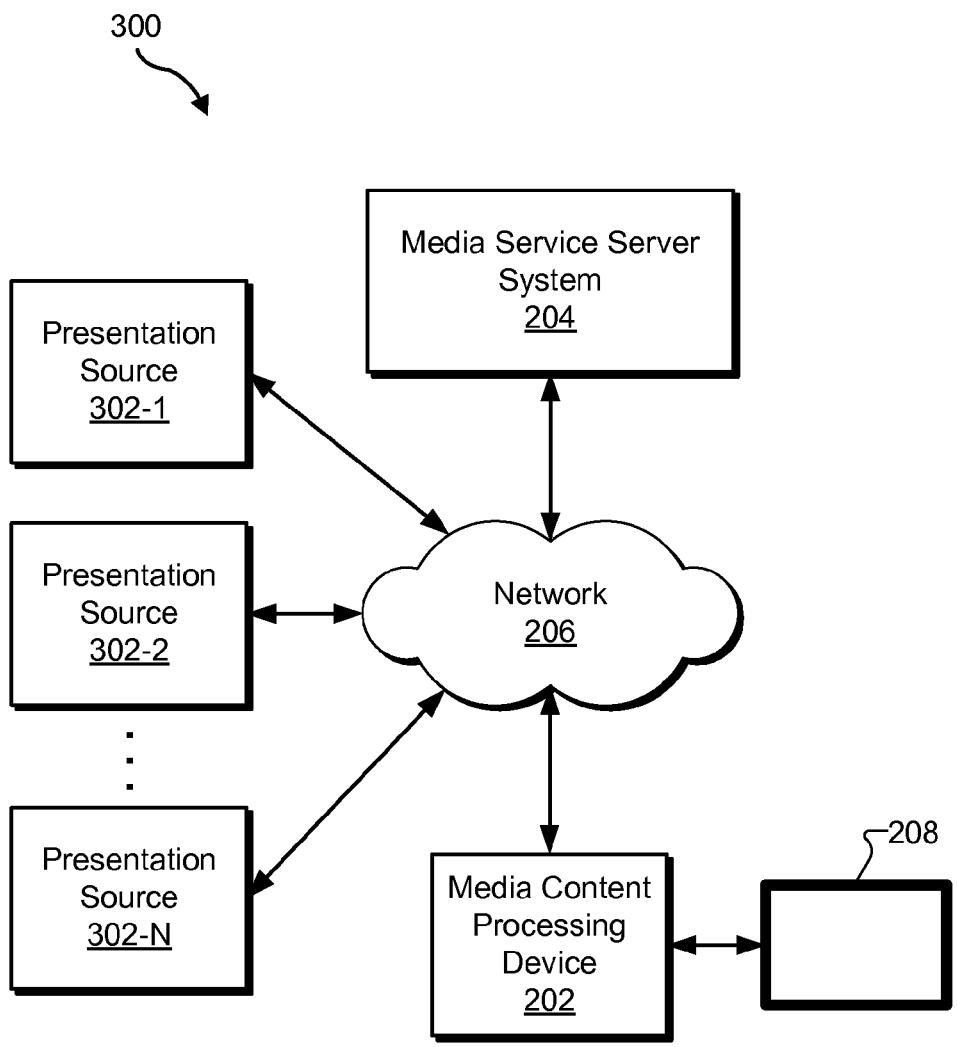
FIG. 3 shows an exemplary configuration in which a plurality of different presentation sources are communicatively coupled to a server system and a media content processing device by way of a network according to principles described herein.

FIG. 3 shows an exemplary configuration 300 in which a plurality of different presentation sources 302 (e.g., presentation source 302-1 through 302-N) are communicatively coupled to server system 204 and media content processing device 202 by way of network 206. As described above, each presentation source 302 may be used by media content processing device 202 to acquire (e.g., record) and/or otherwise make a media program available for access by a user.

For example, a presentation source may include a television source (e.g., a broadcast television source, a subscription television service source, a pay-per-view television source, etc.) that distributes media programs by way of media content channels. As will be described below, media content processing device 202 (e.g., a set-top box device with DVR capabilities) may record media programs provided by a television source.

Another presentation source may include a catch up television service source. As used herein, a "catch up television service source" refers to a network-based server system or the like that is used by a catch up television service that automatically records all television programming broadcast by way of one or more television channels. The television programming may be available for subsequent network access by users of the catch up television service for a predetermined number of days (e.g., three days) after it is recorded.

Another presentation source may include a media-on-demand source (e.g., a video-on-demand source). As used herein, a "media-on-demand source" may include any source that provides on-demand content by way of a network (e.g., a subscription television service network and/or the Internet). Some media-on-demand sources may distribute media programs free of charge to the user. Other media-on-demand sources charge (e.g., by way of a subscription) for media programs that they distribute. Other presentation sources may be used in connection with the methods and systems described herein as may serve a particular implementation.

Various manners in which system 100 may detect user input representative of a request by a user to flag a set of related media programs as being of interest to the user, monitor an availability of the media programs from a plurality of different presentation sources, determine when the user is likely to access each media program included in the set of related media programs, dynamically select a presentation source from the plurality of different presentation sources for each media program included in the set of related media programs, and provide the user with access to each media program included in the set of related media programs by way of a single user interface will now be described.

System 100 may detect user input representative of a request by a user to flag a set of related media programs as being of interest to the user in any suitable manner. For example, system 100 may detect user input representative of a request by a user to flag an entire program series (e.g., a television series) as being of interest to the user. This type of request may be provided by the user in any suitable manner. For example, the user may view a commercial for a television series entitled "Seinfeld" and provide, while the commercial is being presented, user input representative of a request to flag the entire television series. System 100 may detect the user input and, in response, designate the television series as being flagged.

As another example, system 100 may detect user input representative of a request by a user to flag a set of related media programs as being of interest to the user by detecting user input representative of a request by the user to flag a particular media program included in the set of related media programs as being of interest to the user.

To illustrate, the user may provide user input representative of a request to flag a particular media program. In response, system 100 may determine that the particular media program is included in a set of related media programs and automatically designate the entire set of related media programs as being flagged. System 100 may determine that the particular media program is included in a set of related media programs in any suitable manner.

To illustrate, system 100 may determine that a flagged media program is included in a set of related media programs by determining that the flagged media program is an episode included in a program series that includes a plurality of episodes. This determination may be made by analyzing data associated with the media program (e.g., metadata, etc.). For example, a user may flag an entry within an interactive program guide that is representative of a media program entitled "The Simpsons." In response, system 100 may determine that the media program is an episode included in a television series that includes multiple episodes each entitled "The Simpsons."

Additionally or alternatively, system 100 may determine that a flagged media program is included in a set of related media programs by determining that the media program has at least one attribute (e.g., at least one metadata value) in common with the set of related media programs. For example, system 100 may determine that a flagged media program is a broadcast of a football game that features a particular team. System 100 may accordingly determine that the flagged media program is included in a set of already-broadcast and yet-to-be broadcast football games that feature the same team.

In some examples, the user input representative of the request to flag the set of related media programs may include a request to add the set of related media programs (or a particular media program included in the set of related media programs) to a watchlist associated with the user. As used herein, a "watchlist" refers to a self-organizing list of media content the user watches or intends to watch, agnostic of presentation source. Exemplary user interfaces that may be used to present a watchlist to a user will be described below.

Additionally or alternatively, the user input representative of the request to flag the set of related media programs may include a request to "follow" the set of related media programs. For example, a user may view a commercial for a television series and, while the commercial is being presented, provide user input to follow the television series.

Additionally or alternatively, the user input representative of the request to flag the set of related media programs may include a request to record a particular media program included in the set of related media programs. For example, a user may select a "record" option on a remote control device while a media program is being presented in order to record the media program and thereby flag the media program, as well as its corresponding set of related media programs, as being of interest to the user. The request to flag the set of related media programs may be additionally or alternatively provided as may serve a particular implementation.

The request to flag a set of related media programs may be provided in any suitable context. For example, the request to flag a set of related media programs may be provided while a particular media program included in the set is being presented, while the user is interacting with an interactive program guide, while a commercial or trailer for the set of related media programs is being presented, and/or in any other suitable context as may serve a particular implementation.

System 100 may monitor an availability of each media program included in the set of related media programs from a plurality of different presentation sources (e.g., presentation sources 302) in any suitable manner. For example, system 100 may monitor for upcoming airings of each media program by a broadcast television source. This may be performed in any suitable manner. For example, system 100 may search for each media program within a program guide listing associated with the broadcast television source. This search may be performed periodically over time in order to identify future airings of each media program as they become available.

System 100 may additionally or alternatively monitor an availability of each media program from a catch up television service source. For example, system 100 may periodically search for each media program within a program guide listing associated with the catch up television service source.

System 100 may additionally or alternatively monitor an availability of each media program from a media-on-demand source. For example, system 100 may search for each media program within a media-on-demand library provided by a media-on-demand source to which the user has access (e.g., a media-on-demand library associated with a media service provided by system 100, NETFLIX, YOUTUBE, HULU, etc.). The search may be performed periodically in order to identify media programs that are added to the media-on-demand library over time.

System 100 may determine when the user is likely to access each media program included in the set of related media programs in any suitable manner. For example, the determination may be based on a viewing history associated with the user. Data representative of the viewing history may be maintained and/or accessed by system 100 in any suitable manner.

To illustrate, a viewing history associated with the user may indicate that the user has a tendency to flag a media program included in a set of related media programs and then not watch any of the media programs included in the set for a few days. Based on this tendency, system 100 may determine that the user is likely to access each media program included in the set of related media programs after a particular amount of time (e.g., two or more days) has elapsed.

As another example, a viewing history associated with a user may indicate that the user has a tendency to view episodes in sequential order as they appear in a program series. Hence, if the user flags a particular episode in a program series, system 100 may determine that the user is likely to view episodes that precede the flagged episode before the user views episodes that follow the flagged episode. Furthermore, the viewing history associated with the user may indicate that the user typically only views one episode per day. Hence, if there are eight available episodes in the program series, system 100 may determine that the user is likely to watch the eighth episode in the program series at least eight days after flagging one of the episodes.

As another example, a viewing history associated with a user may indicate that the user has already watched the first five episodes included in a program series within a relatively short period of time (e.g., a day). System 100 may accordingly determine that the user is likely to watch at least the sixth episode in the program series at any time.

System 100 may additionally or alternatively use a user profile associated with the user to determine when the user is likely to access each media program included in the set of related media programs. As used herein, a "user profile" associated with a user may include data representative of one or more of the user's traits (e.g., one or more demographic attributes of the user), preferences (e.g., genre preferences, product preferences, etc.), access privileges, and/or any other data descriptive of the user as may serve a particular implementation.

For example, a user profile associated with a user may indicate that the user is a twenty-one year old female. Based on this data, system 100 may analyze viewing tendencies of other twenty-one year old females and predict that the user will have similar viewing tendencies.

In some examples, system 100 may, for a particular media program included in the set of related media programs, determine when the user is likely to access the particular media program by determining a time frame during which the user is likely to access the particular media program. For example, system 100 may determine that the user is likely to access the particular media program during a particular day, during a particular week, and/or during any other time frame as may serve a particular implementation.

Based on the monitored availability of the media programs from the different presentation sources and on when the user is likely to access each media program included in the set of related media programs, system 100 may dynamically select a presentation source from the plurality of different presentation sources for each media program included in the set of related media programs. In other words, system 100 may determine how each media program included in the set of related media programs is to be made available for access by the user. Various examples of system 100 dynamically selecting a presentation source for each media program included in the set of related media programs will now be described.

In one particular example, a user may provide a request to flag a set of related media programs. In response, system 100 may determine that a particular media program included in the set of related media programs is going to be broadcast by way of a broadcast television source a day after the user provides the request to flag the set of related media programs and that the media program is also going to be available by way of a video-on-demand source starting a day after the media program is broadcast. System 100 may also determine that the user likely will not view the media program until after the media program becomes available by way of the video-on-demand source.

Based on this determination, system 100 may select the video-on-demand source instead of the broadcast television source as the presentation source for the media program. In other words, system 100 may direct a media content processing device associated with the user to abstain from recording the media program by way of the broadcast television source (i.e., while the media program is being broadcast by the broadcast television source) and instead use the media-on-demand source to present the media program when the user provides user input representative of a request to view the media program. In this manner, the media program may be made available to the user when the user wants to access the media program without the media content processing device having to record the media program and thereby consume valuable storage space and download bandwidth.

In another example, a user may provide a request to flag a set of related media programs. As in the previous example, system 100 may, in response, determine that a particular media program included in the set of related media programs is going to be broadcast by way of a broadcast television source a day after the user provides the request to flag the set of related media programs and that the media program is also going to be available by way of a video-on-demand source starting a day after the media program is broadcast. However, in this example, system 100 may determine that the user is likely to view the media program the same day that the media program is to be broadcast.

Based on this determination, system 100 may select the broadcast television source as the presentation source for the media program. In other words, system 100 may direct a media content processing device associated with the user to record the media program by way of the broadcast television source. In this manner, the media program may be available for access when the user decides to watch the media program.

Over time, the availability of a particular media program from the plurality of different presentation sources may change. Likewise, there may be a change in when the user is likely to access the media program. System 100 may account for these changes by dynamically selecting a new presentation source in place of an originally selected presentation source for the media program.

For example, system 100 may initially select a first presentation source included in the plurality of different presentation sources for a particular media program. System 100 may subsequently detect a change in the monitored availability of the particular media program from the plurality of different presentation sources and/or a change in when the user is likely to access the particular media program. Based on this, system 100 may subsequently select a second presentation source from the plurality of different presentation sources in place of the first presentation source for the media program.

To illustrate, a media program included in a set of related media programs flagged by a user may be initially available only by way of a television source. System 100 may accordingly direct a media content processing device associated with the user to record the media program by way of the television source. Subsequently, system 100 may determine that the media program becomes available by way of a media-on-demand source. In response, system 100 may select the media-on-demand source in place of the television source for the media program. In other words, system 100 may direct the media content processing device to delete the recording of the media program and instead use the media-on-demand source to provide the user with access to the media program.

As another example, a media program included in a set of related media programs flagged by a user may be initially only available by way of a subscription-based media-on-demand source. System 100 may accordingly select the subscription-based media-on-demand source as the presentation source for the media program. System 100 may subsequently determine that the media program is going to be broadcast by way of a broadcast television source. System 100 may accordingly select the broadcast television source for the media program in place of the subscription-based media-on-demand source in order to provide the user with future access to the media program without having to subscribe to the subscription-based media-on-demand source.

As another example, a media program may be initially available by way of both a catch up television service source and a broadcast television source. In this example, system 100 may initially determine that the user is likely to view the media program prior to the media program being broadcast by way of the broadcast television source. In response, system 100 may select the catch up television service source as the presentation source for the media program. However, when the time comes for the media program to be broadcast, system 100 may determine that the user has not yet watched the media program. In response, system 100 may select the broadcast television source in place of the catch up television service source as the presentation source for the media program. In other words, system 100 may direct a media content processing device associated with the user to record the media program during the broadcast of the media program. In this manner, the media program may be available for access by the user, even if the user decides to watch the media program after a period of time during which the media program is available by way of the catch up television service source.

System 100 may provide the user with access to each media program included in a set of related media programs by way of a single user interface (e.g., a single view of a user interface) regardless of which presentation source included in a plurality of different presentation sources is selected for each media program included in the set of related media programs in any suitable manner. For example, system 100 may direct a media content processing device associated with the user to present, within the single user interface, a plurality of graphical objects representative of the media programs. Each graphical object may be selected by the user to access (e.g., view, access information associated with, etc.) a corresponding media program.

Figure 4:
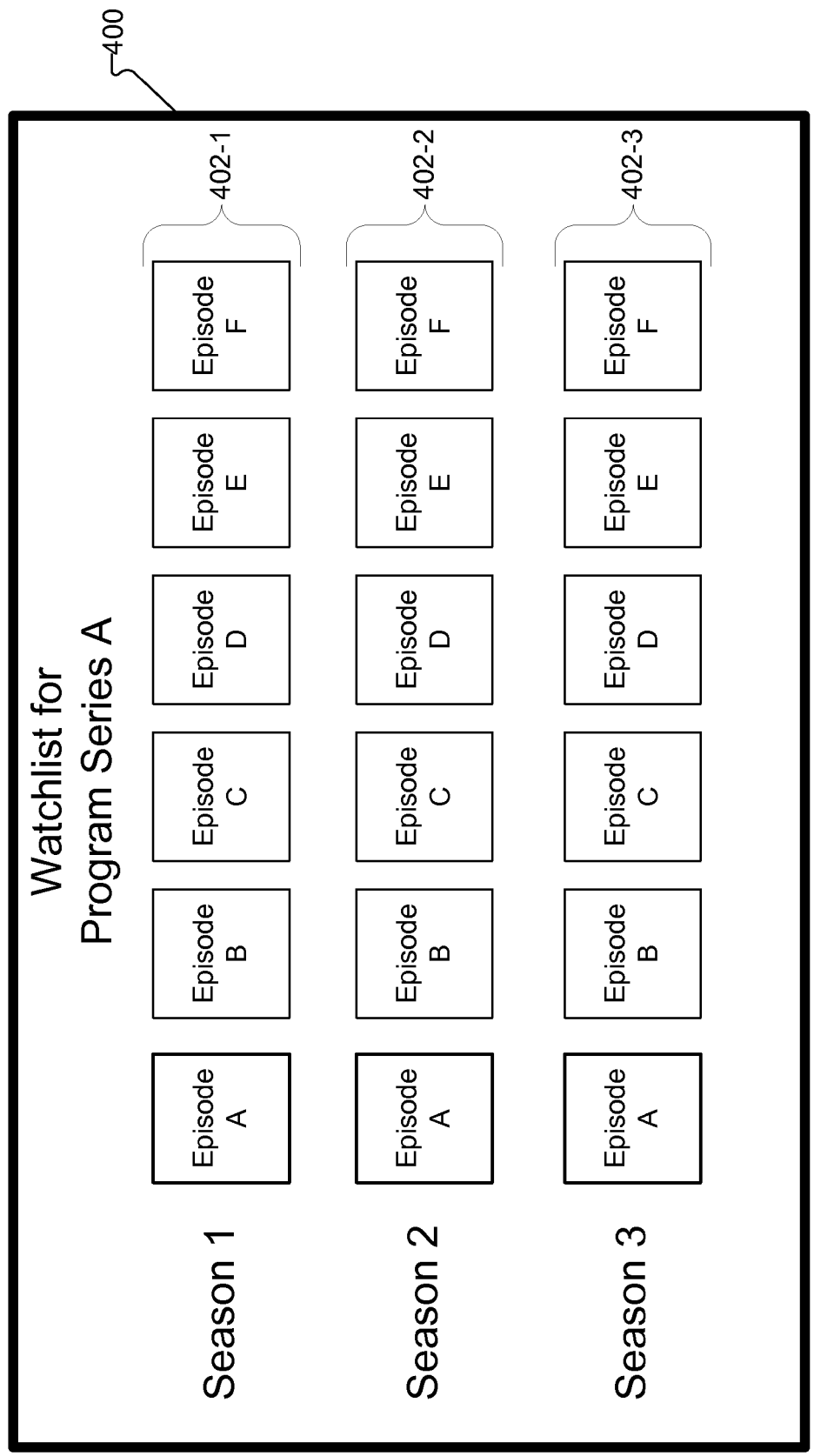
FIGS. 4-5 show exemplary user interfaces that may facilitate access to each media program included in a set of related media programs according to principles described herein.

To illustrate, FIG. 4 shows an exemplary user interface 400 that may be presented by a media content processing device associated with a user and that may facilitate access to each media program included in a set of related media programs. As shown, user interface 400 may include a plurality of graphical objects 402 representative of a plurality of episodes included a program series labeled "Program Series A". For example, graphical objects 402 may include a first set of graphical objects 402-1 representative of episodes included in a first season of the program series labeled "Program Series A", a second set of graphical objects 402-2 representative of episodes included in a second season of the program series labeled "Program Series A", and a third set of graphical objects 402-3 representative of episodes included in a third season of the program series labeled "Program Series A".

Graphical objects 402 may be displayed within user interface 400 in response to a user providing user input representative of a request to flag the program series labeled "Program Series A" as being of interest to the user. For example, graphical objects 402 may be displayed within user interface 400 in response to the user flagging a particular episode (e.g., an episode included in the third season of the program series) as being of interest to the user. In response to the user flagging the particular episode as being of interest to the user, system 100 may determine that there are other episodes of the program series available for access. System 100 may accordingly monitor a plurality of presentation sources for each episode and determine when the user is likely to access each episode. Based on this, system 100 may dynamically select a presentation source for each episode and display graphical objects 402 representative of each episode within user interface 400.

In some examples, the user may select a particular graphical object displayed in user interface 400 in order to access (e.g., watch) the episode represented by the particular graphical object. For example, system 100 may detect a user selection of the graphical object labeled "Episode A" of season two. In response, system 100 may direct the media content processing device to present the episode using a presentation source that has been dynamically selected for the episode. In some examples, the presentation of the episode may be performed without informing the user of the particular presentation source that is used to present the episode. Alternatively, the user may be notified of the particular presentation source that is used to present the episode (e.g., by displaying a badge icon together with the graphical object representative of the episode that identifies the presentation source associated with the episode).

As described above, different presentation sources may be selected for the various episodes represented by graphical objects 402. For example, system 100 may direct the media content processing device to use a television source for some of the episodes (e.g., by recording these episodes as they are broadcast by way of the television source), a catch up television service source for some of the episodes, and a media-on-demand source for some of the episodes. In this manner, the single graphical user interface 400 may be used to facilitate access to each of the episodes regardless of what presentation source is selected for each of the episodes.

Figure 5:
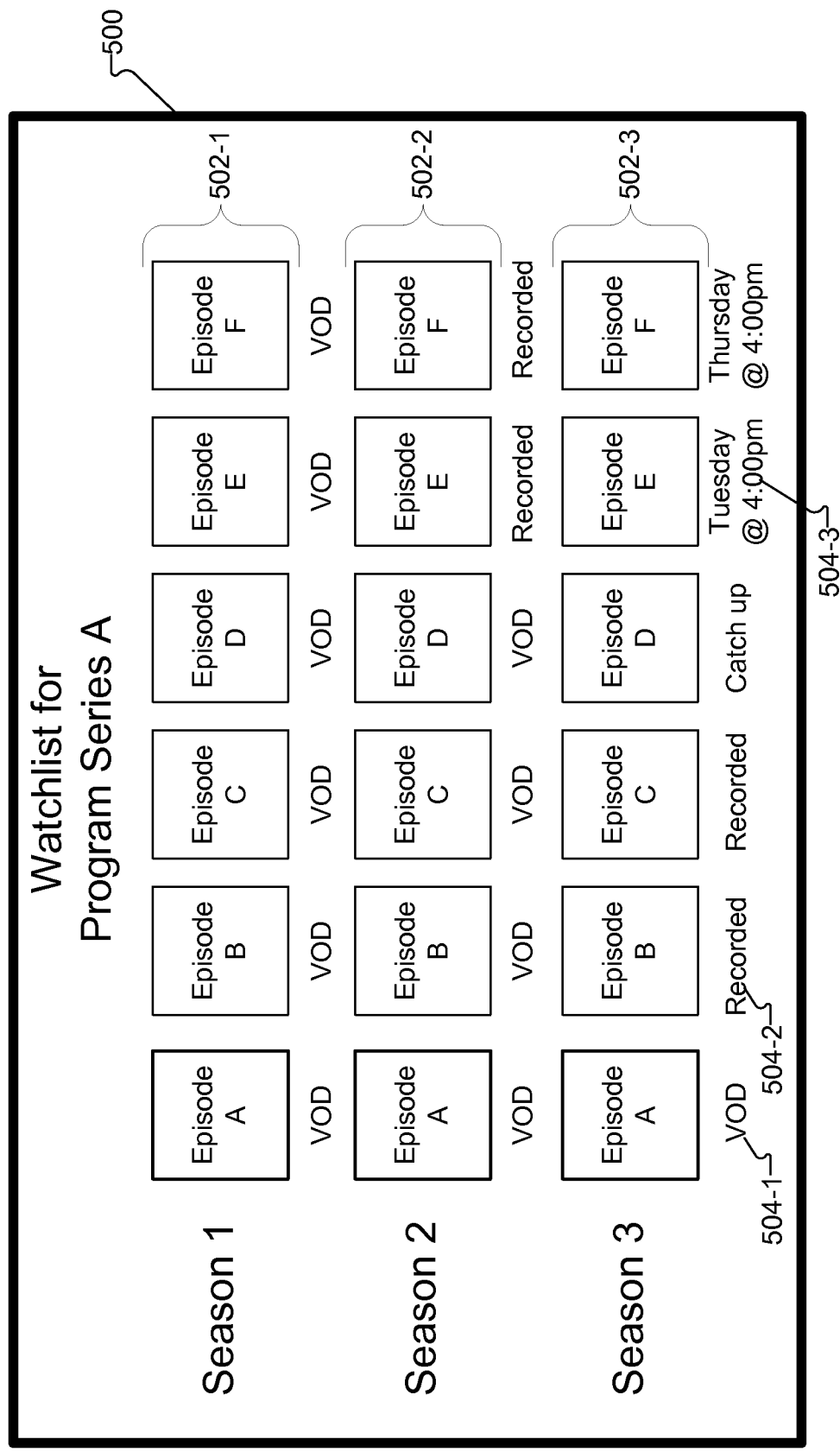

FIG. 5 shows a user interface 500 that is similar to user interface 400, except that user interface 500 includes badge icons that indicate the presentation source for each episode represented by graphical objects 502. To illustrate, badge icon 504-1 indicates that the episode labeled "Episode A" in season three of the program series is available by way of a video-on-demand source. As another example, badge icon 504-2 indicates that that the episode labeled "Episode B" in season three of the program series has been recorded by the media content processing device.

In some examples, system 100 may include, for display in user interface 500, a graphical object representative of a particular episode included in the program series even if the particular episode is not yet available for access by the user from any of the presentation sources. For example, user interface 500 includes graphical objects representative of episodes labeled "Episode E" and "Episode F" of season three of the program series, each of which is not currently available for access by the user. In this example, system 100 may notify the user of when the episodes will become available for access. For example, system 100 may present badge icon 504-3 in connection with the graphical object representative of the episode labeled "Episode E" of season three in order to notify the user that the episode will be available by way of the television source on Tuesday at 4:00 pm.

Figure 6:
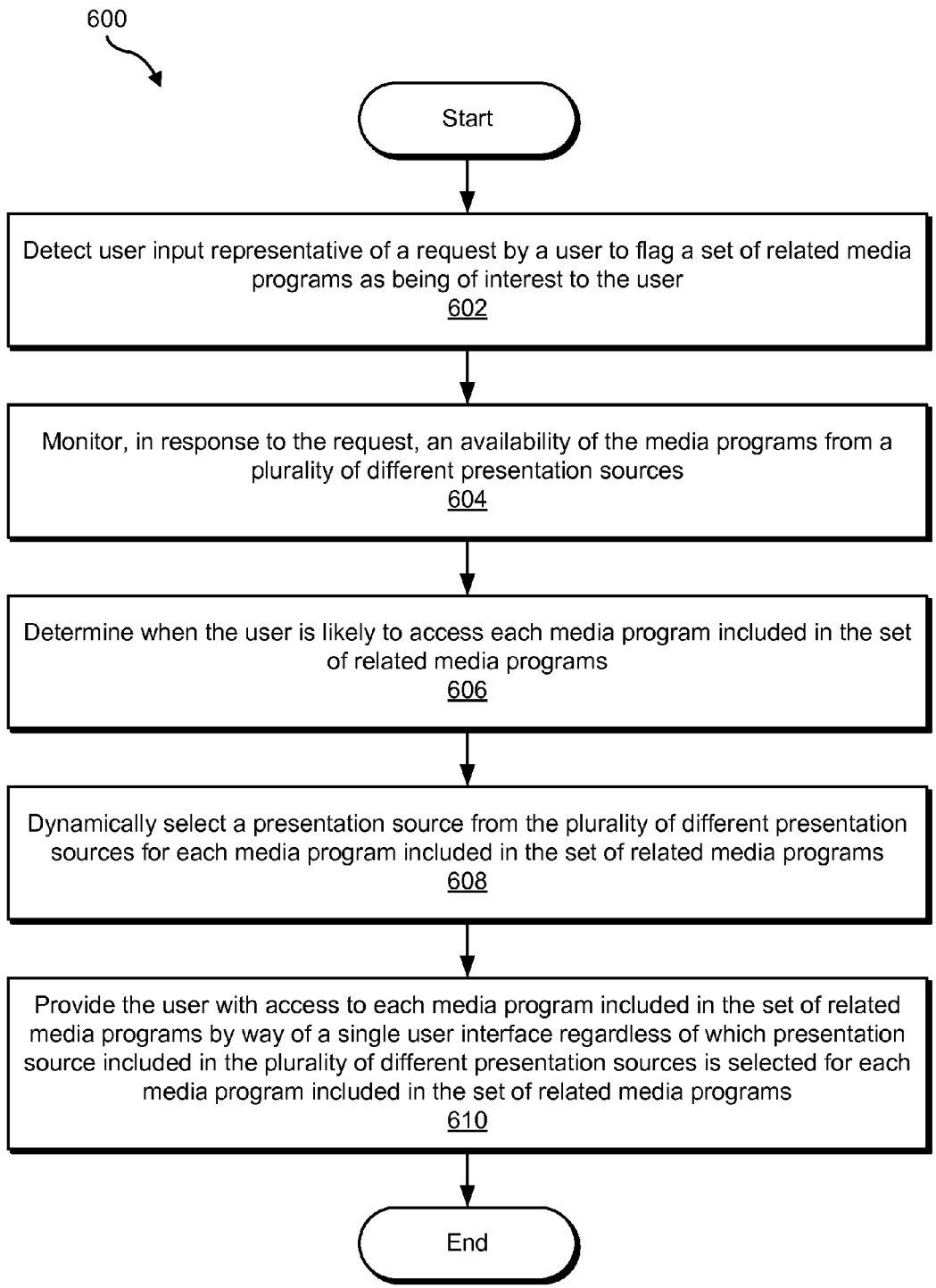
FIG. 6 illustrates an exemplary method for providing source-agnostic access to media programs according to principles described herein.

FIG. 6 illustrates an exemplary method 600 for providing source-agnostic access to media programs. While FIG. 6 illustrates exemplary steps according to one embodiment, other embodiments may omit, add to, reorder, and/or modify any of the steps shown in FIG. 6. One or more of the steps shown in FIG. 6 may be performed by system 100 and/or any implementation thereof.

In step 602, a computer-implemented media service system detects user input representative of a request by a user to flag a set of related media programs as being of interest to the user. Step 602 may be performed in any of the ways described herein.

In step 604, the computer-implemented media service system monitors, in response to the request, an availability of the media programs from a plurality of different presentation sources. Step 604 may be performed in any of the ways described herein.

In step 606, the computer-implemented media service system determines when the user is likely to access each media program included in the set of related media programs. Step 606 may be performed in any of the ways described herein.

In step 608, the computer-implemented media service system dynamically selects a presentation source from the plurality of different presentation sources for each media program included in the set of related media programs. As described above, the dynamic selection may be based on the monitored availability of the media programs from the different presentation sources and on when the user is likely to access each media program included in the set of related media programs. Step 608 may be performed in any of the ways described herein.

In step 610, the computer-implemented media service system provides the user with access to each media program included in the set of related media programs by way of a single user interface regardless of which presentation source included in the plurality of different presentation sources is selected for each media program included in the set of related media programs. Step 610 may be performed in any of the ways described herein.

Figure 7:
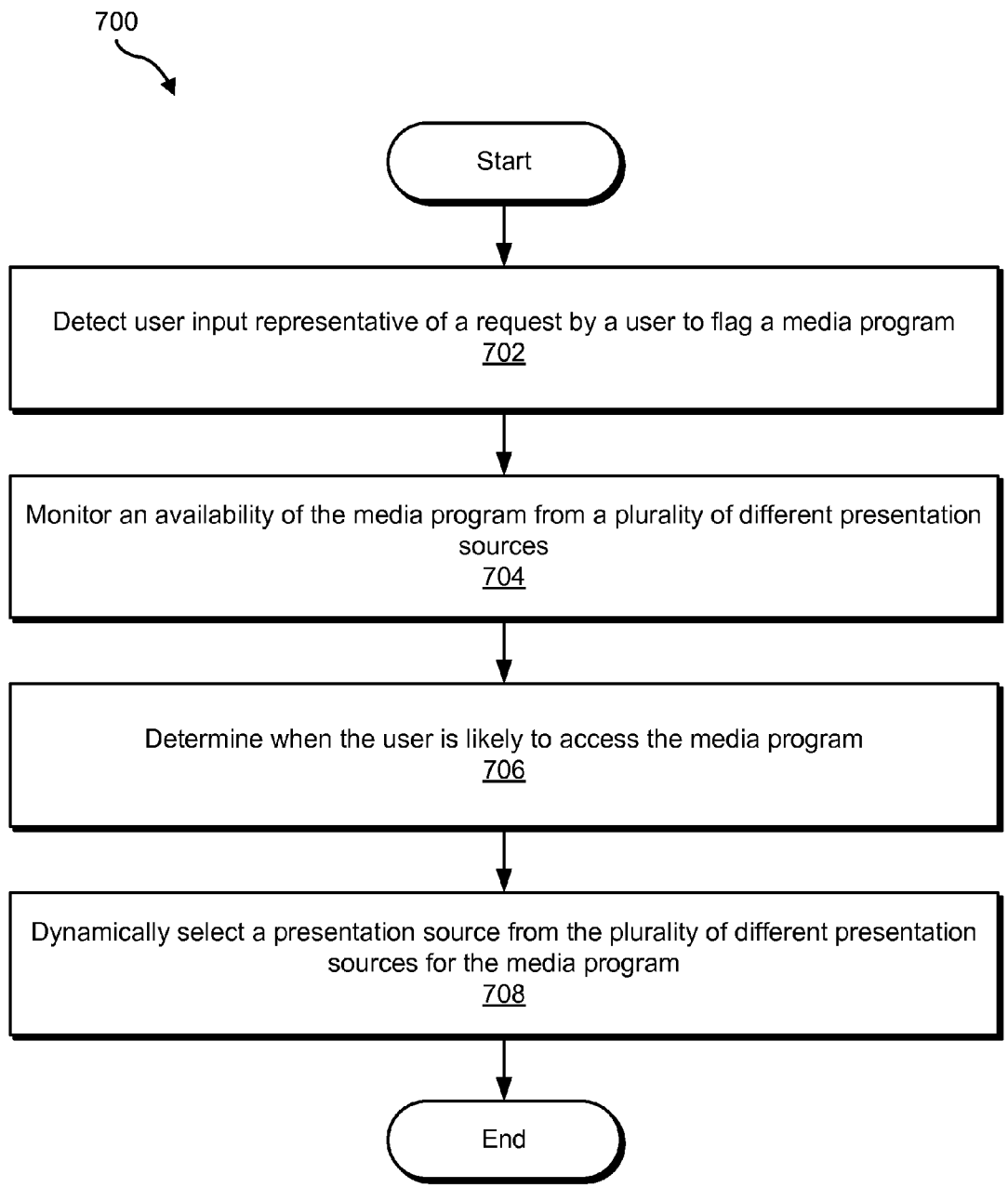
FIG. 7 illustrates another exemplary method for providing source-agnostic access to media programs according to principles described herein.

FIG. 7 illustrates another exemplary method 700 for providing source-agnostic access to media programs. While FIG. 7 illustrates exemplary steps according to one embodiment, other embodiments may omit, add to, reorder, and/or modify any of the steps shown in FIG. 7. One or more of the steps shown in FIG. 7 may be performed by system 100 and/or any implementation thereof.

In step 702, a computer-implemented media service system detects user input representative of a request by a user to flag a media program. Step 702 may be performed in any of the ways described herein.

In step 704, the computer-implemented media service system monitors an availability of the media program from a plurality of different presentation sources. Step 704 may be performed in any of the ways described herein.

In step 706, the computer-implemented media service system determines when the user is likely to access the media program. Step 706 may be performed in any of the ways described herein.

In step 708, the computer-implemented media service system dynamically selects a presentation source from the plurality of different presentation sources for the media program. As described above, the dynamic selection may be based on the monitored availability of the media program from the different presentation sources and/or on when the user is likely to access the media program. Step 708 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 8:
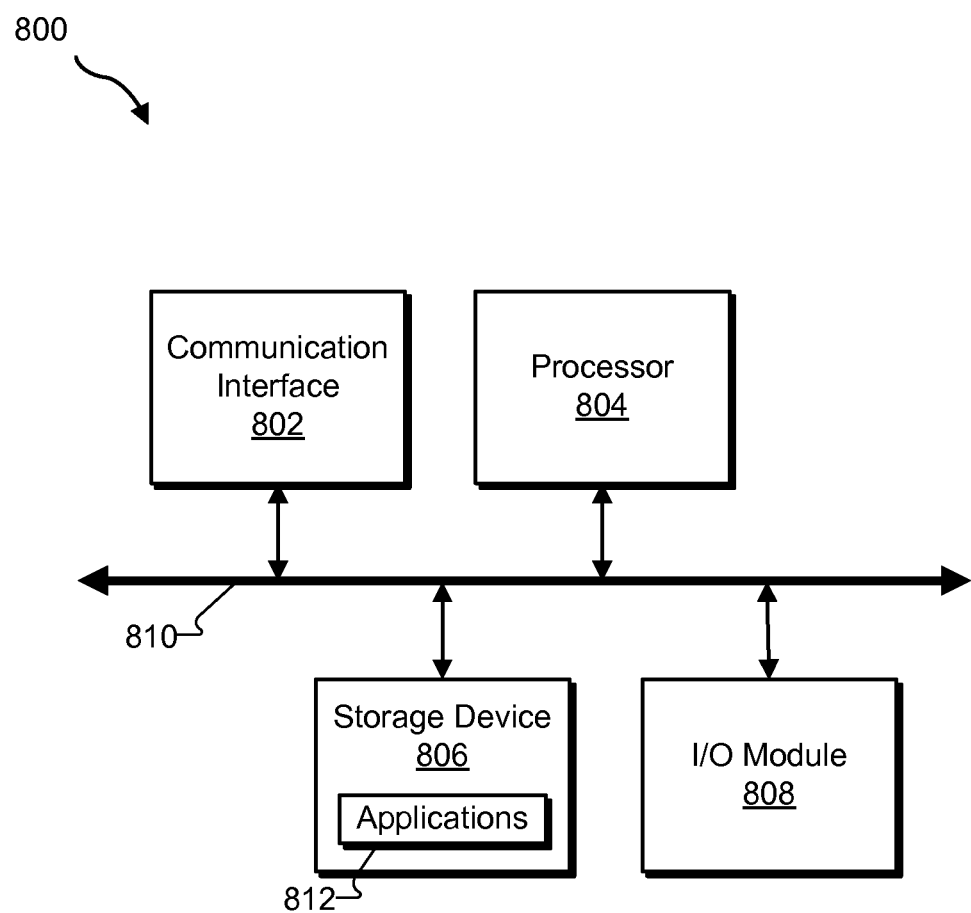
FIG. 8 illustrates an exemplary computing device according to principles described herein.

FIG. 8 illustrates an exemplary computing device 800 that may be specifically configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with detection facility 102 and content management facility 104. Likewise, storage facility 106 may be implemented by or within storage device 806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

detecting, by a computer-implemented media service system, user input representative of a request by a user to flag a set of related media programs as being of interest to the user;

monitoring, by the computer-implemented media service system in response to the request, an availability of the media programs from a plurality of different presentation sources, each of the plurality of different presentation sources configured to provide one or more of the available media programs for direct consumption by the user by way of a media content processing device associated with the user;

determining, by the computer-implemented media service system, when the user is likely to access each media program included in the set of related media programs;

dynamically selecting, by the computer-implemented media service system based on the monitored availability of the media programs from the different presentation sources and on when the user is likely to access each media program included in the set of related media programs, a presentation source from the plurality of different presentation sources for each media program included in the set of related media programs;

providing, by the computer-implemented media service system and by way of the media content processing device, the user with access to each media program included in the set of related media programs by way of a single user interface regardless of which presentation source included in the plurality of different presentation sources is selected for each media program included in the set of related media programs;

detecting, by the computer-implemented media service system and subsequent to the providing of the user with access to each media program included in the set of related media programs by way of the single user interface, at least one of a change in the monitored availability of a particular media program included in the set of related media programs from the plurality of different presentation sources and a change in when the user is likely to access the particular media program;

selecting, by the computer-implemented media service system and based on the detecting of the at least one of the change in the monitored availability of the particular media program included in the set of related media programs from the plurality of different presentation sources and the change in when the user is likely to access the particular media program, a different presentation source for the particular media program than was initially dynamically selected; and providing, by the computer-implemented media service system subsequent to the selecting of the different presentation source and by way of the media content processing device, the user with access to the particular media program as well as access to each other media program included in the set of related media programs by way of the single user interface regardless of which presentation source included in the plurality of different presentation sources is selected for each media program included in the set of related media programs.

2. The method of claim 1, wherein the detecting of the user input representative of the request by the user to flag the set of related media programs as being of interest to the user comprises detecting user input representative of a request by the user to flag a particular media program included in the set of related media programs as being of interest to the user.

3. The method of claim 2, further comprising determining, by the computer-implemented media service system, that the particular media program is included in the set of related media programs by determining that the particular media program is an episode included in a program series that includes a plurality of episodes.

4. The method of claim 1, wherein the determining of when the user is likely to access each media program included in the set of related media programs is based on at least one of a viewing history associated with the user and a user profile associated with the user.

5. The method of claim 1, wherein:
the monitoring of the availability of the media programs from the plurality of different presentation sources comprises determining that a particular media program included in the set of related media programs is available both by way of a television source during a first time period subsequent to the user input representative of the request by the user and by way of a media-on-demand source during a second time period subsequent to the first time period;
the determining when the user is likely to access each media program included in the set of related media programs comprises determining that the user is likely to access the particular media program during the second time period; and
the dynamically selecting of the presentation source for each media program included in the set of related media programs comprises selecting, based on the determination that the particular media program is available by way of the media-on-demand source during the second time period and on the determination that the user is likely to access the particular media program during the second time period, the media-on-demand source for the particular media program.

6. The method of claim 5, further comprising directing, by the computer-implemented media service system based on the selecting of the media-on-demand source, the media content processing device associated with the user to abstain from recording the particular media program by way of the television source during the first time period.

7. The method of claim 1, wherein:
the monitoring of the availability of the media programs from the plurality of different presentation sources comprises determining that a particular media program included in the set of related media programs is available both by way of a television source during a first time period subsequent to the user input representative of the request by the user and by way of a media-on-demand source during a second time period subsequent to the first time period;
the determining when the user is likely to access each media program included in the set of related media programs comprises determining that the user is likely to access the particular media program prior to the second time period; and
the dynamically selecting of the presentation source for each media program included in the set of related media programs comprises selecting, based on the determination that the particular media program is available by way of the television source during the first time period and that user is likely to access the particular media program prior to the second time period, the television source for the particular media program.

8. The method of claim 7, wherein the selecting of the television source for the particular media program comprises directing the media content processing device associated with the user to record the particular media program by way of the television source during the first time period.

9. The method of claim 1, wherein the providing of the user with access to each media program included in the set of related media programs by way of the single user interface comprises directing the media content processing device associated with the user to present, within the single user interface, a plurality of graphical objects representative of the media programs.

10. The method of claim 9, wherein the dynamically selecting comprises selecting a particular presentation source included in the plurality of different presentation sources for a particular media program included in the set of related media programs, and wherein the method further comprises:
detecting, by the computer-implemented media service system, a user selection of a particular graphical object included in the plurality of graphical objects and representative of the particular media program; and
directing, by the computer-implemented media service system, the media content processing device to use the particular presentation source to present the particular media program.

11. The method of claim 1, embodied as computer-executable instructions on at least one non-transitory computer-readable medium.

12. A method comprising:
detecting, by a computer-implemented media service system, user input representative of a request by a user to flag a media program;
monitoring, by the computer-implemented media service system, an availability of the media program from a plurality of different presentation sources, each of the plurality of different presentation sources configured to provide one or more of the available media programs for direct consumption by the user by way of a media content processing device associated with the user;

determining, by the computer-implemented media service system, when the user is likely to access the media program;

dynamically selecting, based on the monitored availability of the media program from the different presentation sources and on when the user is likely to access the media program, a presentation source from the plurality of different presentation sources for the media program;

providing, by the computer-implemented media service system and by way of a media content processing device, the user with access to the media program and a set of related media programs by way of a single user interface regardless of which presentation source included in the plurality of different presentation sources is selected for the media program;

detecting, by the computer-implemented media service system and subsequent to the providing of the user with access to each media program and the set of related media programs by way of the single user interface, at least one of a change in the monitored availability of the media program from the plurality of different presentation sources and a change in when the user is likely to access the media program;

selecting, by the computer-implemented media service system and based on the detecting of the at least one of the change in the monitored availability of the media program from the plurality of different presentation sources and the change in when the user is likely to access the media program, a different presentation source for the media program than was initially dynamically selected; and providing, by the computer-implemented media service system subsequent to the selecting of the different presentation source and by way of the media content processing device, the user with access to the media program as well as access to each other media program included in the set of related media programs by way of the single user interface regardless of which presentation source included in the plurality of different presentation sources is selected for the media program.

13. The method of claim 12, embodied as computer-executable instructions on at least one non-transitory computer-readable medium.

14. A system comprising:
a memory; and
at least one processor that is communicatively coupled to the memory and that:
  detects user input representative of a request by a user to flag a set of related media programs as being of interest to the user;
  monitors, in response to the request, an availability of the media programs from a plurality of different presentation sources, each of the plurality of different presentation sources configured to provide one or more of the available media programs for direct consumption by the user by way of a media content processing device associated with the user;
  determines when the user is likely to access each media program included in the set of related media programs;
  dynamically selects, based on the monitored availability of the media programs from the different presentation sources and on when the user is likely to access each media program included in the set of related media programs, a presentation source from the plurality of different presentation sources for each media program included in the set of related media programs;
  provides, by way of the media content processing device, the user with access to each media program included in the set of related media programs by way of a single user interface regardless of which presentation source included in the plurality of different presentation sources is selected for each media program included in the set of related media programs;
  detects, subsequent to the providing of the user with access to each media program included in the set of related media programs by way of the single user interface, at least one of a change in the monitored availability of a particular media program included in the set of related media programs from the plurality of different presentation sources and a change in when the user is likely to access the particular media program;
  selects, based on the detecting of the at least one of the change in the monitored availability of the particular media program included in the set of related media programs from the plurality of different presentation sources and the change in when the user is likely to access the particular media program, a different presentation source for the particular media program than was initially dynamically selected; and
  provides, subsequent to the selecting of the different presentation source and by way of the media content processing device, the user with access to the particular media program as well as access to each other media program included in the set of related media programs by way of the single user interface regardless of which presentation source included in the plurality of different presentation sources is selected for each media program included in the set of related media programs.

15. The system of claim 14, wherein the at least one processor detects the user input representative of the request by the user to flag the set of related media programs as being of interest to the user by detecting user input representative of a request by the user to flag a particular media program included in the set of related media programs as being of interest to the user.

16. The system of claim 15, wherein the at least one processor determines that the particular media program is included in the set of related media programs by determining that the particular media program is an episode included in a program series that includes a plurality of episodes.

17. The system of claim 14, wherein the at least one processor uses at least one of a viewing history associated with the user and a user profile associated with the user to determine when the user is likely to access each media program included in the set of related media programs.

18. The system of claim 14, wherein the at least one processor provides the user with access to each media program included in the set of related media programs by way of the single user interface by directing the media content processing device associated with the user to present, within the single user interface, a plurality of graphical objects representative of the media programs.

19. The system of claim 18, wherein the at least one processor performs the dynamic selection by selecting a particular presentation source included in the plurality of different presentation sources for a particular media program included in the set of related media programs, and wherein the at least one processor further:

detects a user selection of a particular graphical object included in the plurality of graphical objects and representative of the particular media program; and directs the media content processing device to use the particular presentation source to present the particular media program.

20. The method of claim 1, wherein the dynamically selecting of the presentation source comprises dynamically selecting only one presentation source included in the plurality of different presentation sources for each of the media programs included in the set of related media programs.

* * * * *